United States Patent [19]
Kikuchi

[11] Patent Number: 5,475,758
[45] Date of Patent: Dec. 12, 1995

[54] USER AUTHENTICATING SYSTEM AND METHOD IN WIDE AREA DISTRIBUTED ENVIRONMENT

[75] Inventor: Hiroaki Kikuchi, Kawasaki, Japan

[73] Assignee: Fujitsu Limited, Kawasaki, Japan

[21] Appl. No.: 183,293

[22] Filed: Jan. 19, 1994

[30]   Foreign Application Priority Data

Jan. 22, 1993 [JP]   Japan ................................. 5-008817

[51] Int. Cl.$^6$ ............................. H04L 9/32; H04L 9/30
[52] U.S. Cl. ............................. 380/25; 380/23; 380/30; 380/49; 340/825.31; 340/825.34
[58] Field of Search ............................. 380/4, 9, 23, 24, 380/25, 30, 49, 50; 340/825.31, 825.34

[56]   References Cited

U.S. PATENT DOCUMENTS

| | | | |
|---|---|---|---|
| 4,853,961 | 8/1989 | Pastor | 380/25 X |
| 4,868,877 | 9/1989 | Fischer | 380/25 |
| 4,885,777 | 12/1989 | Takaragi et al. | 380/30 |
| 4,893,338 | 1/1990 | Pastor | 380/25 |
| 4,935,962 | 6/1990 | Austin | 380/25 |
| 5,005,200 | 4/1991 | Fischer | 380/30 |
| 5,164,988 | 11/1992 | Matyas et al. | 380/25 |
| 5,200,999 | 4/1993 | Matyas et al. | 380/25 |
| 5,214,702 | 5/1993 | Fischer | 380/30 |
| 5,222,140 | 6/1993 | Beller et al. | 380/30 |
| 5,299,263 | 3/1994 | Beller et al. | 380/30 |
| 5,307,411 | 4/1994 | Anvret et al. | 380/25 |

*Primary Examiner*—Bernarr E. Gregory
*Attorney, Agent, or Firm*—Staas & Halsey

[57]   ABSTRACT

A user authenticating system includes a certification authority for issuing a certification to a user who desires to use a bulletin board system. The certification is obtained by enciphering original information including at least information identifying the user using a secret key. A computer is, provided in the bulletin board system, for authenticating the user based on the certification. The computer has a deciphering unit for deciphering the certification using a public key so as to obtain the original information and a determining knit for determining based on the original information obtained by the deciphering unit whether the user is a regular user. A result obtained by the determination unit, used to authenticate the user. A user support computer is provided in the bulletin board system for supplying, based on operations of the user, the certification issued by the certification authority to the computer for authenticating the user.

21 Claims, 7 Drawing Sheets

FIG. 4

| | CERTIFICATION AUTHORITY |
|---|---|
| Step 1 | IDENTIFYING UNIT 21c IDENTIFIES USER (A). |
| Step 2 | CODING UNIT 21d CODES IDENTIFICATION INFORMATION (Ia) INCLUDING PERSONAL INFORMATION SUCH AS NAME OF USER AND USER'S POSITION. |
| Step 3 | ENCIPHERING UNIT 21e ENCIPHERS IDENTIFICATION INFORMATION (Ia) USING SECRET KEY(d), AND ISSUES CERTIFICATION(CA). |
| Step 4 | ISSUED CERTIFICATION (CA) IS CONFIDENTIALLY SUPPLIED TO USER(A). |
| Step 5 | ISSUED CERTIFICATION (CA) IS CONFIDENTIALLY HELD IN TRUST IN CERTIFICATION STORAGE UNIT 21b. |

FIG.5

| | USER | COMPUTER |
|---|---|---|
| Step 1 | RANDOM NUMBER(R) IS GENERATED AND SUPPLIED TO SCRAMBLING UNIT 22e. | |
| Step 2 | CIPHER PROCESSING UNIT 22d ENCIPHERS RANDOM NUMBER(R) USING PUBLIC KEY(e), AND GENERATES SCRAMBLING FACTOR(Y). | |
| Step 3 | SCRAMBLING FACTOR(Y) IS TRANSMITED TO COMPUTER 24 VIA COMMUNICATION UNIT 22g. | |
| Step 4 | | SCRAMBLING FACTOR(Y) IS RECEIVED, AND TEMPORARILY STORED IN SCRAMBLING FACTOR STORAGE UNIT 24d. |
| Step 5 | | RANDOM NUMBERS(b) ARE GENERATED, AND TRANSMITED TO USER(A) BY COMMUNICATION UNIT 24i. |
| Step 6 | IF b=0, X(=R) IS TRANSMITTED TO COMPUTER 24. | |
| Step 7 | IF b=1, X(=CA·R mod N) IS CALCURATED BY SCRAMBLING UNIT 22e AND X IS TRANSMITTED TO COMPUTER 24. | |
| Step 8 | | IF b=0, Z(=$X^e$ mod N) IS CALCULATED BY CIPHER PROCESSING UNIT 24b, AND IT IS DETERMINED WHETHER OR NOT Z IS EQUAL TO Y. |

FIG. 6

| | USER | COMPUTER |
|---|---|---|
| Step 9 | | IF $b=1$, $Zi(=Xe/Y \bmod Y)$ IS CALCULATED BY DESCRAMBLING UNIT 24e AND CIPHER PROCESSING UNIT 24b, AND IDENTIFICATION INFORMATION (Ia) IS OBTAINED. |
| Step 10 | | IT IS DETERMINED WHETHER OR NOT IDENTIFCATION INFORMATION (Ia) IS EFFECTIVE INFORMATION AND WHETHER OR NOT IDENTIFICATION INFORMATION (Ia) IS CONTRADICTORY TO INFOMATION FROM CONTROL INFORMATION TAKING UNIT 24h. |
| Step 11 | | IF NORMAL IN CASES OF $b=1$ AND $0$, $n$ IS DECREMENTED BY ONE $(n-1)$. ABOVE PROCESS IS REPEATED UNTIL $n$ REACHES ZERO $(n=0)$. |

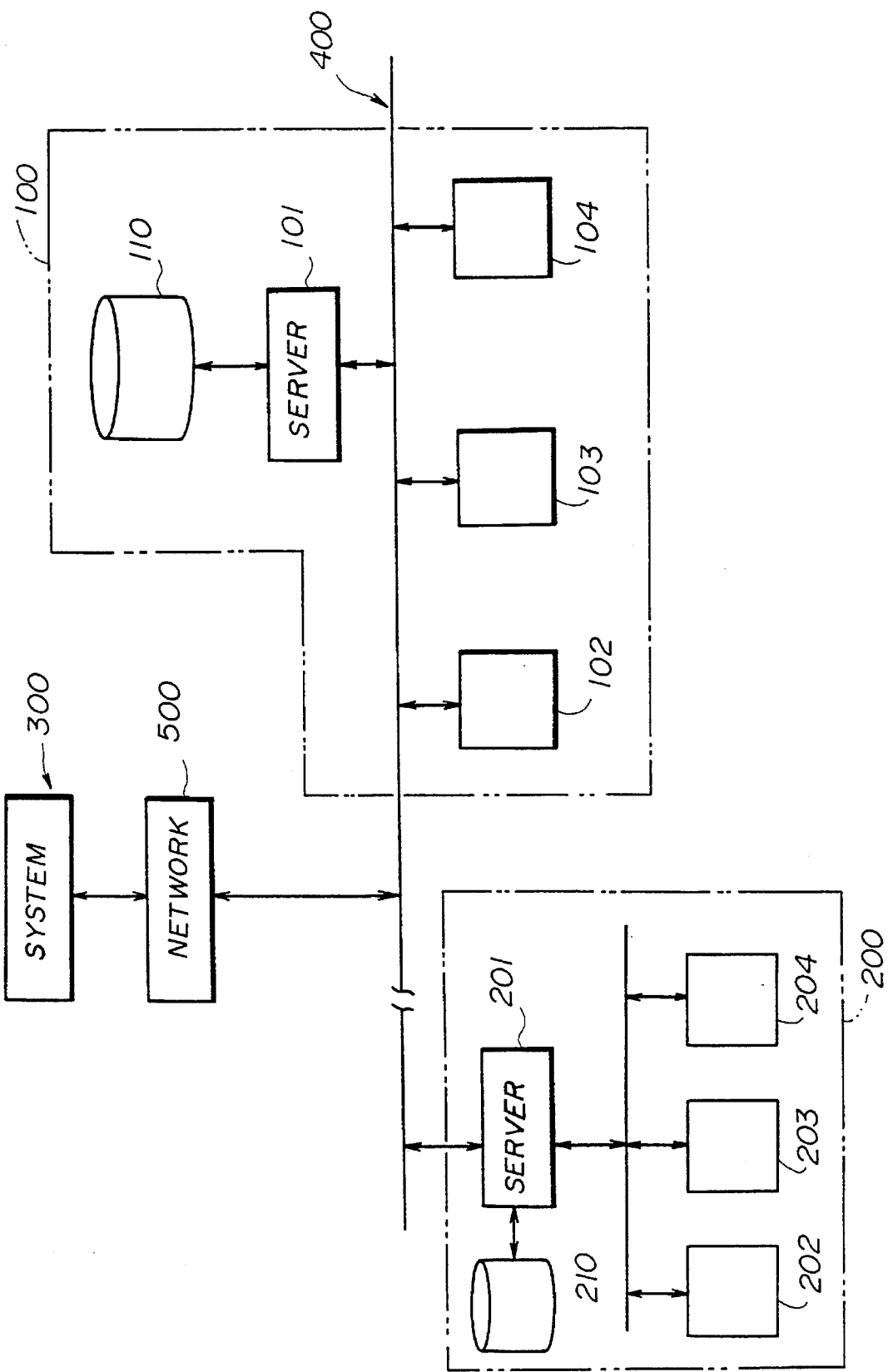

USER AUTHENTICATING SYSTEM AND METHOD IN WIDE AREA DISTRIBUTED ENVIRONMENT

BACKGROUND OF THE INVENTION (1) Field of the Invention

The present invention relates to a user authenticating system and method in a wide area distributed environment formed in a network, in which system and method registered information regarding a user is centrally managed and in which the security against tapping into the network and against successful impersonation of an authorized user by an unauthorized user is improved.

(2) Description of the Related Art

In recent years, in a distributed processing environment formed in a LAN (Local Area Network), a single user simultaneously uses many computer resources via the network so that a large amount of computing power is drawn from the distributed processing environment.

However, since each user must be recorded as a regular user in all of the computers, the load of management of the users in each computer is increased.

To cope with the increased load of management in each computer, conventionally, an information sharing service called by an NIS (Network Information System) has been widely used. FIG.1 shows an NIS having computers 51A, 51B and 51C, and a master database 52B, which database is employed by a user 53. In this system, the computer 51B is provided with the master database 52B. Other computers 51A and 51C refer to the master database 52B via a network, so that management information, such as passwords, stored in the master database 52B are shared by all computers 51A, 51B and 51C. The registration of a user is performed in the master database 52B connected to the computer 51B. The management of the user is unified. As a result, there may be no case where information for the same user in the respective computers is conflicting.

However, since information such as passwords needed in authentication of users is shared by all of the computers 51A, 51B and 51C in this system, it is possible to carry out tapping to obtain a password and pass-word-analysis in which a password is found using a dictionary. In addition, an illegitimate practice can occur in which an unauthorized user impersonating a regular user obtains access to a computer using false management information in which regular management information is changed in a computer for relaying packets. Thus, the conventional system has a problem concerning security.

Furthermore, in the system in which the database is shared by a plurality of computers, if faults occur in the network, the database cannot be used by any computers. Thus, the system has also a problem concerning reliability. Since many faults may occur in a wide area network in particular, a user authenticating system for authenticating a user without using information (e.g. a password) stored in the database is desired.

SUMMARY OF THE INVENTION

Accordingly, a general object of the present invention is to provide a useful and novel user authenticating system and method in a wide area distributed environment, in which system and method the disadvantages of the aforementioned prior art are eliminated.

A more specific object of the present invention is to provide a user authenticating system and method in which security against the tapping and the alteration of information in a wide area distributed environment is improved.

Another object of the present invention is to provide a user authenticating system and method which are tolerant of faults occurring in a network.

Another object of the present invention is to provide a user authenticating system and method capable of easily managing users authenticated in a wide area distributed environment.

The above objects of the present invention are achieved by a user authenticating system comprising a certification authority, an authenticating unit, and a supply unit. The authenticating unit issues a certification to a user who desires to use a predetermined system, the certification being obtained by enciphering original information including at least information identifying the user using a secret key. The authenticating unit is provided in the predetermined system and authenticates the user based on the certification. The authenticating unit has a deciphering unit for deciphering the certification using a public key so as to obtain the original information and a determining unit for determining based on the original information obtained by the deciphering unit whether the user is an authorized user, a result obtained by the determination unit being used to authenticate the user. The supply unit is provided in the predetermined system, communicates with the authenticating unit, and supplies, based on operations of the user, the certification issued by the certification authority to the authenticating unit.

The above objects of the present invention are also achieved by a user authenticating method comprising the steps of: (a) issuing a certification from a certification authority to a user who desires to use a predetermined system, the certification being obtained by enciphering original information including at least information identifying the user using a secret key; (b) supplying the certification from the user to an authenticating unit; and (c) authenticating the user in the authenticating unit based on the certification. Step (c) includes steps of: (c-1) deciphering the certification using a public key so as to obtain the original information; and (c-2) determining based on the original information obtained by the step (c-1) whether or not the user is a authorized user, a result obtained by the step (c-2) being used to authenticate the user.

According to the present invention, the user who desires to use the predetermined system is authenticated, based on the certification issued by trusted certification authority, by the authenticating unit provided in the predetermined system. Thus, security against the tapping and the alteration of information in a wide area distributed environment is improved. In addition, a user authenticating system which is tolerant of faults occurring in a network can be obtained.

Furthermore, since the management of users is unified in the certification authority, the management of users authenticated in a wide area distributed environment can be easily carried out.

Additional objects, features and advantages of the present invention will become apparent from the following detailed description when read in conjunction with the accompanying drawings.

BRIEF DESCRIPTION OF THE DRAWINGS

FIG. 4 is a flow chart illustrating a process in a certification authority.

FIG. 5 is a flow chart illustrating processes in a computer for a user and a computer for authenticating the user.

FIG. 6 is a flow chart illustrating a process in the computer for authenticating the user.

FIG. 7 is a block diagram illustrating an example of a wide area distributed environment to which the user authenticating system shown in FIG. 2 is applicable.

DESCRIPTION OF THE PREFERRED EMBODIMENTS

A description will now be given, with reference to FIG. 2, of the principle of a user authenticating system according to an embodiment of the present invention.

Figure 1:
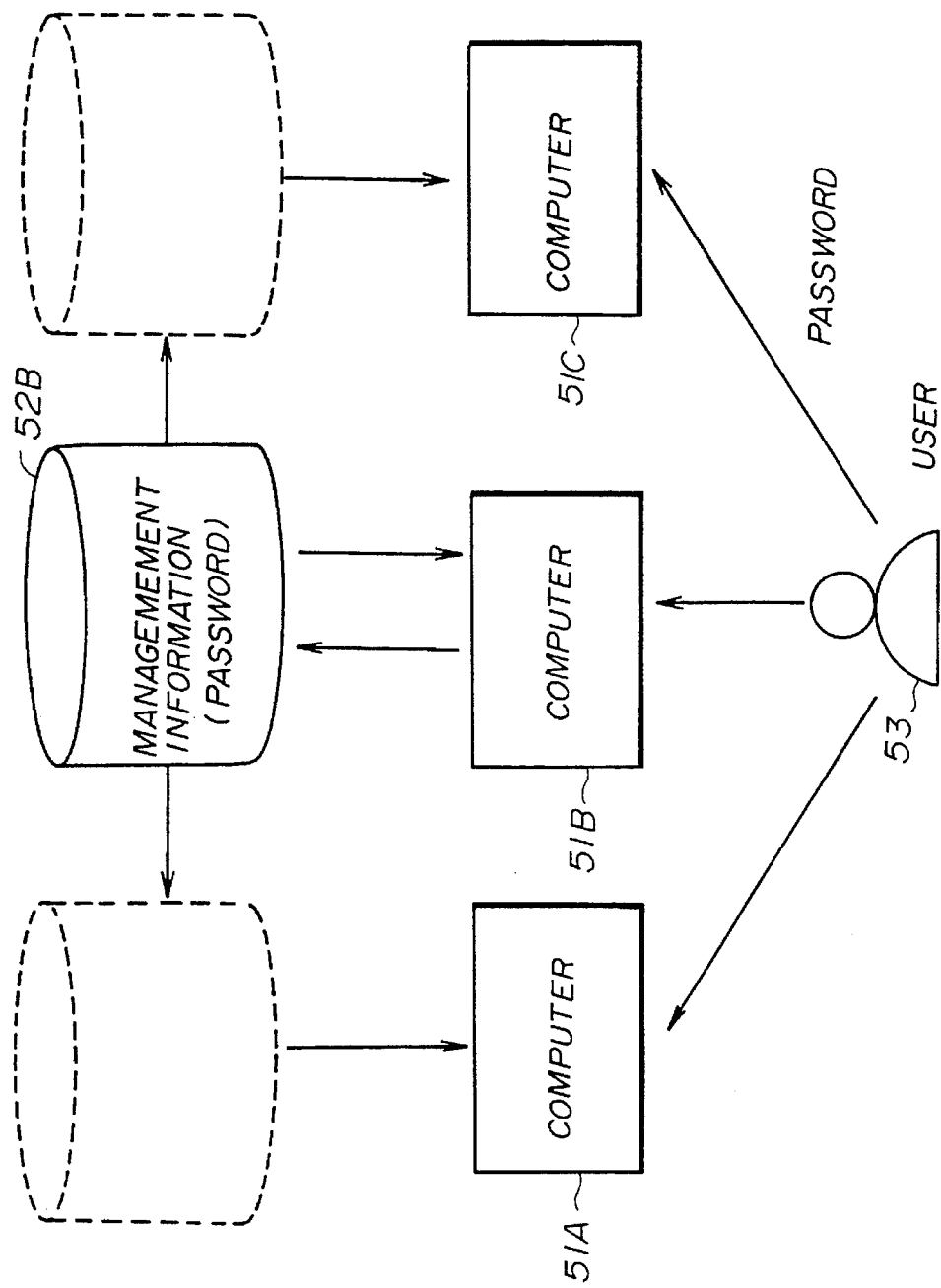
FIG. 1 is a block diagram illustrating a conventional user authenticating system in a wide area distributed environment.
Figure 2:
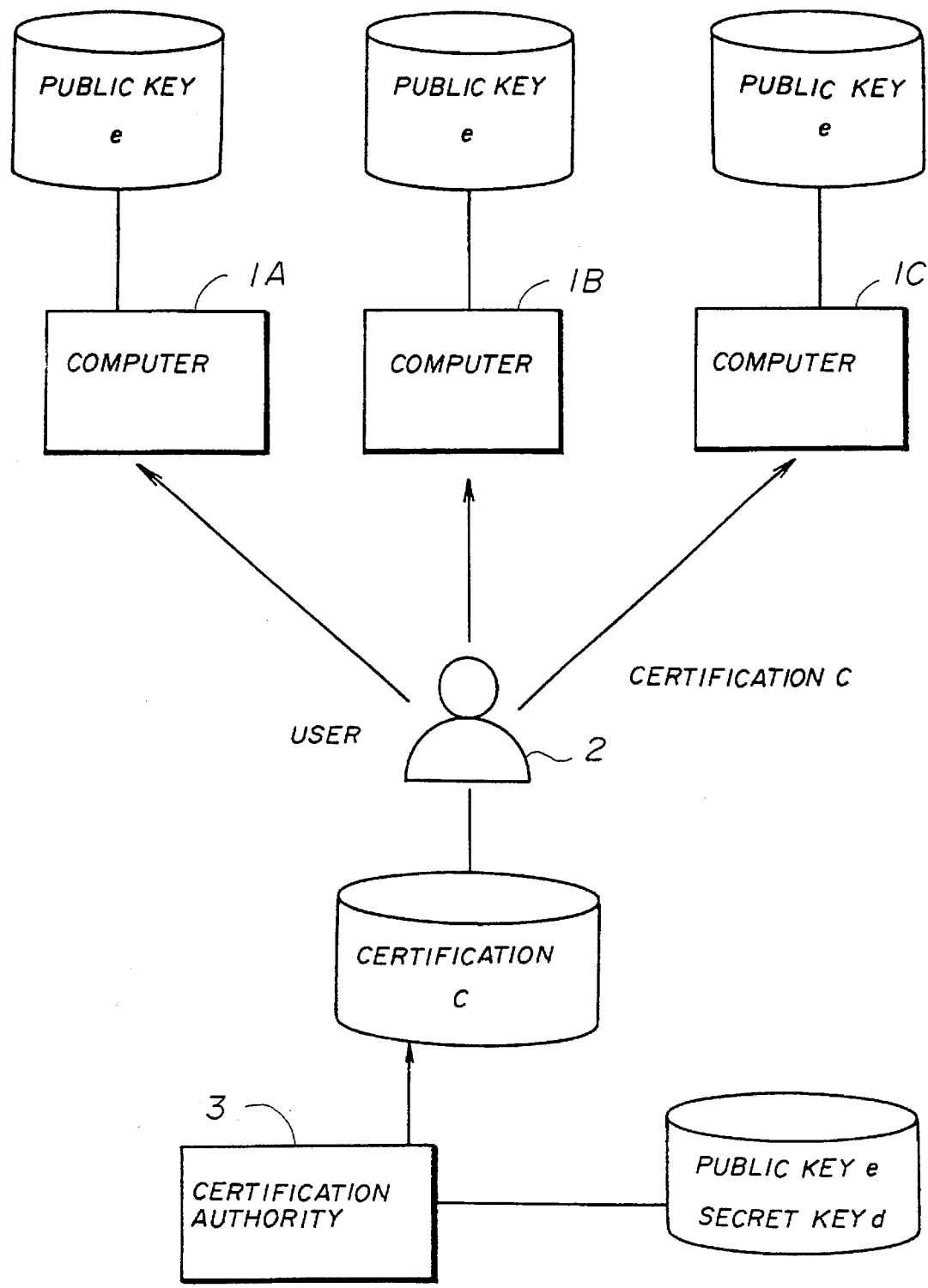
FIG. 2 is a block diagram illustrating the principle of a user authenticating system according to an embodiment of the present invention.

Referring to FIG. 2, computers 1A, 1B and 1C, for authenticating users, and a user support computer are coupled to each other by a line. The user support computer is one used by a user 2. A certification authority 3 issues a certification C for the user 2. The certification authority 3 has a secret key (d), a public key (e) and public information (N). The certification C issued to the user 2 is supplied to the user support computer having the public key (e) and the public information (N). Each of the computers 1A, 1B and 1C is provided with the public key (e) and the public information (N).

The certification C assures the identity of the user 2, and is issued by only the certification authority 3 having the secret key (d). The validity of the certification C can be ascertained by anyone having the public key (e). The certification C has contents corresponding to identification information (Ia) including personal information concerning the user 2, such as a name of the user 2, and environment information, such as the final limit of the period covered by the certification C, addresses of computers able to be used by the user 2 and the like.

In response to a request from the user 2, the certification authority 3 identifies the user 2, and enciphers the identification information (Ia) (including the personal information concerning the user 2 and the environment information) using the secret key (d) so that the certification C having the contents corresponding to the personal information and the environment information is obtained. The certification authority 3 then issues the certification C to the user 2. The user 2 receives, for example, a medium on which the certification C is recorded, such as a paper, a floppy disk, a magnetic card or an IC card.

The user 2 inputs the certification C to the user support computer, and the certification C is then supplied from the user support computer to each of the computers 1A, 1B and 1C for authenticating the user. Each of the computers 1A, 1B and 1C deciphers the certification C using the public key (e) so as to obtain the personal information concerning the user 2 and the environment information, and determines, based on the personal information and the environment information, whether the user 2 is an authorized user permitted to use this system. If the user 2 is determined to be an authorized regular user, each of the computers 1A, 1B and 1C authenticates the user 2.

In the above user authenticating system, each of the computers 1A, 1B and 1C authenticates the user 2 based on the certification C formally issued by the certification authority 3. Thus, the registration of users can be unified in the certification authority 3, so that the load required to manage users can be reduced. In addition, the certification C is calculated based on the cryptographic technology using the secret key (d), and each of the computers 1A, 1B and 1C can determine, based on the public key (e), whether the certification C is genuine. Thus, it is not necessary for the computers to share the management information, so that the security against the tapping and alteration of the management information is improved. Furthermore, since the computers do not share the management information, the user authenticating system has a high reliability against faults occurring in the network.

Under a condition in which the secret key (d) is safely managed in the certification authority 3, it is impossible for a third person to issue a false certification. That is, to calculate back to the secret key (d) based on the public key (e) and the public information (N), a very long integer must be resolved into prime factors by a large number of calculations. Thus, if an enciphering key having a sufficient length is used, it is virtually impossible to carry out the calculation back to the secret key (d). Thus, an unauthorized user is prevented from impersonating the regular user by a false certification C.

A description will now be given of an embodiment of the present invention.

Figure 3:
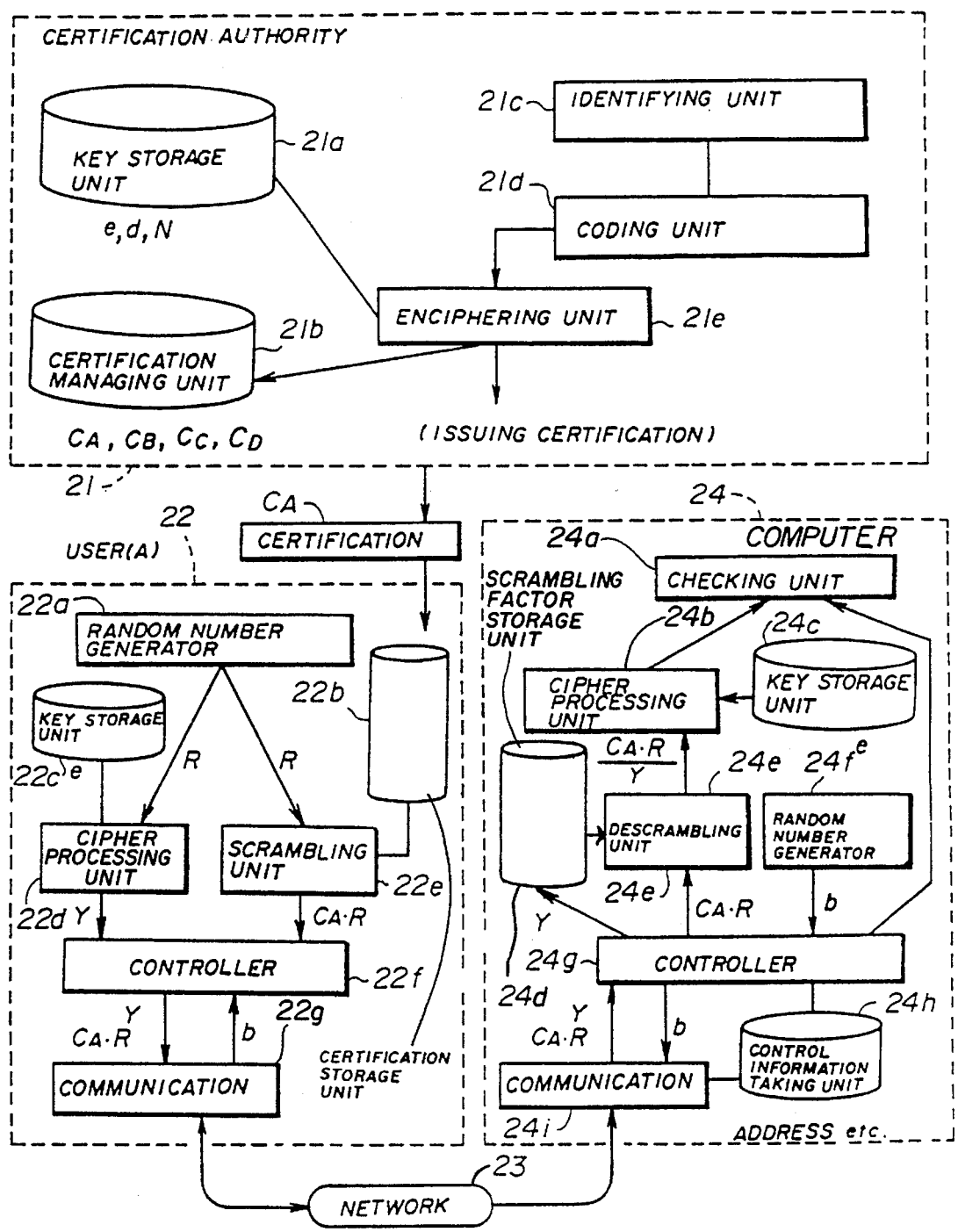
FIG. 3 is a block diagram illustrating a user authenticating system according to an embodiment of the present invention.

FIG. 3 shows a user authenticating system according to an embodiment of the present invention. Referring to FIG. 3, a certification authority 21 has a key storage unit 21a, a certification managing unit 21b, an identifying unit 21c, a coding unit 21d and an enciphering unit 21e. The key storage unit 21a confidentially stores a secret key (d), a public key (e) and public information (N). The certification managing unit 21b holds issued certifications CA, CB, CC and CD in trust. The identifying unit 21c identifies each user based on information directly provided by each user or supplied by confidential means. The coding unit 21d codes identification information (Ia) including the personal information concerning each user such as a name of each user and environment information such as the final limit of the period covered by each certification, addresses of computers able to be used by each user and the like. The enciphering unit 21e enciphers the coded identification information (Ia) using the secret key (d) so as to issue a certification having the contents corresponding to the identification information (Ia).

A user support computer 22 has a random number generator 22a, a certification storage unit 22b, a key storage unit 22c, a cipher processing unit 22d, a scrambling unit 22e, a controller 22f and a communication unit 22g. The random number generator 22a generates random numbers R, and the random numbers R are supplied to both the cipher processing unit 22d and the scrambling unit 22e. The certification storage unit 22b confidentially stores a certification CA issued for a user (A) by the certification authority 21. The key storage unit 22c stores a public key (e) and public information (N). The cipher processing unit 22d enciphers a random number R using the public key (e) so as to generate a scrambling factor (Y). The scrambling unit 22e scrambles the certification CA using the random number R. The controller 22f controls the allover user support computer 22. The communication unit 22g controls communication with another computer via a network 23.

A computer 24 for authenticating each user has a checking unit 24a, a cipher processing unit 24b, a key storage unit 24c, a scrambling factor storage unit 24d, a descrambling unit 24e, a random number generator 24f, a controller 24g, a control information taking unit 24h and a communication unit 24i. The checking unit 24a checks the identification information (Ia) and determines whether the certification is genuine. The cipher processing unit 24b deciphers the enciphered and scrambled identification information (Ia) using the public key (e). The key storage unit 24c stores the public key (e) and the public information (N). The scrambling factor storage unit 24d temporarily stores the scrambling factor (Y) and supplies the scrambling factor (Y) to the descrambling unit 24e. The descrambling unit 24e descrambles the result obtained by the scrambling unit 22e in the user support computer 22 so that identification information (Ia) is obtained. The random number generator 24f generates random numbers, and the controller 24g controls the allover computer 24. The control information taking unit 24h is provided with information concerning communication control and supplies it to the checking unit 24a. The communication unit 24i controls the communication with another computer via the network 23.

The certification authority 21, the user support computer 22 and the computer 24 for authenticating a user operate in accordance with procedures as shown in FIGS. 4, 5 and 6. The operations in a case where the certification CA for the user (A) is issued and the user (A) having the certification CA uses computer resources in the system will be described below, with reference to FIGS. 4, 5 and 6.

The certification authority 21 identifies the user (A) and issues a certification CA. The issued certification CA is directly given to the user (A) by hand not via the network, or is supplied from the certification authority 21 to the user (A) by an external method, such as a confidential method.

In the operation for issuing the certification CA, as shown in FIG. 4, the identifying unit 21c identifies the user (A) in response to a request supplied from the user (A) along with the personal information of the user (A) (step 1). The coding unit 21d codes the identification information (Ia) including the personal information, such as a name of the user (A) and a user's position, supplied from the user (A) and the environment information such as IP-addresses of computers able to be used by the user (A) (step 2). After this, the enciphering unit 21e enciphers the identification information (Ia) using the public information (N) and the secret key (d) in accordance with the following equation so that the certification CA is obtained and issued (step 3).

$$CA = Ia^d \cdot \mod N \quad (1)$$

The issued certification CA is confidentially supplied to the user (A) as described above (step 4). Further, the issued certification CA is confidentially held in trust in the certification storage unit 21b of the certification authority 21 (step 5).

To use the computer resources, the user (A) having the issued certification CA supplies the issued certification CA to the user support computer 22 and the certification CA is then stored in the certification storage unit 22b of the user support computer 22. When the user (A) inputs an operation request to the user support computer 22, the authentication of the user (A) is performed by the computer 24 via the network 23 in accordance with the procedure shown in FIG. 5. To raise the security, an operation for authenticating the user (A) may be repeated a plurality of times. In this embodiment, it is assumed that the operation is repeated n times.

The random number generator 22a of the user support computer 22 generates a random number R and supplies it to the scrambling unit 22e and the cipher processing unit 22d (step 1 in FIG. 5). The cipher processing unit 22d enciphers the random number R using the public key (e) and the public information (N) in accordance with the following equation so that a scrambling factor (Y) is obtained (step 2).

$$Y = R^e \cdot \mod N \quad (2)$$

The scrambling factor (Y) generated by the cipher processing unit 22d is supplied to the communication unit 22g via the controller 22f. The communication unit 22g transmits the scrambling factor (Y) to the computer 24 for authenticating the user (A) (step 3).

In the computer 24, the communication unit 24i receives the scrambling factor (Y), and the scrambling factor (Y) is supplied via the controller 24g to the scrambling factor storage unit 24d which stores it (step 4). The random number generator 24f generates random numbers (b) each having a value of either "0" or "1". The random numbers (b) are supplied to communication unit 24i via the controller 24g and are transmitted via the network 23 from the communication unit 24i to the user support computer 22 (step 5).

When the communication unit 22g of the user support computer 22 receives a random number (b), the random number (b) is supplied to the controller 22f. The controller 22f determines whether the random number (b) has a value of "0" or "1". If it is determined that the random number (b) has a value of "0", data X which is equal to R (X=R) is transmitted from the user support computer 22 to the computer 24 (step 6). On the other hand, if it is determined that the random number (b) has a value of "1", the data X is calculated in accordance with the following equation by the scrambling unit 22e and is transmitted from the user support computer 22 to the computer 24 (step 7).

$$X = CA \cdot R \cdot \mod N \quad (b=1) \quad (3)$$

That is, the certification CA is scrambled using the random number R and the public information (N) so as to obtain the data X, and the scrambled certification CA is transmitted to the computer 24.

The data X is received by the communication unit 24i of the computer 24. The data X is supplied from the communication unit 24i to the cipher processing unit 24b via the controller 24g. The cipher processing unit 24b deciphers the data X using the public key (e) and the public information (N) in accordance with the following equation so that data Z is obtained.

$$Z = X^e \cdot \mod N \quad (4)$$

When the random number (b) has the value of "0", the data X transmitted from the user support computer 22 is equal to the random number (R). In this case, the data Z is to be equal to the scrambling factor (Y=R^e·mod N). Thus, the controller 24g determines, using the scrambling factor (Y) stored in the scrambling factor storage unit 24d, whether the data Z is equal to the scrambling factor (Y) (step 8).

On the other hand, when the random number (b) has the value of "1", the data X transmitted from the user support computer 22 is the scrambled certification CA (X=CA·R·mod N). In this case, the data Z output from the cipher processing unit 24b is indicated by the following equation.

$$\begin{align}
Z &= (CA \cdot R)^e \cdot \bmod N \qquad (5)\\
&= CA^e \cdot R^e \cdot \bmod N\\
&= Ia^{de} \cdot Y\\
&= Ia \cdot Y
\end{align}$$

The descrambling unit 24e descrambles the data Z, using the scrambling factor (Y) stored in the scrambling factor storage unit 24d, in accordance with an equation (Z/Y), so that the identification information (Ia) is obtained (step 9).

After this, the checking unit 24a determines whether the identification information (Ia) obtained by the above process is valid information, and whether the identification information (Ia) is contradictory to the information supplied from the control information taking unit 24h (step 10). When it is determined that the results obtained by the controller 24g and the checking unit 24a are normal in the two cases in which the random number (b) has the values of "0" and "1" the number (n) of times in which the above process is to be repeated is decremented by one to (n−1), and the above process is repeated from step 1 shown in FIG. 5 (step 11). The above processes is then repeated until the number (n) reaches "0". If it is determined, n times, that the above results obtained by the controller 24g and the checking unit 24a are normal, the computer 24 authenticates the user (A). As a result, the user (A) is permitted to operate the user support computer 22 and can use information in the computer 24 via the network 23.

According to the above embodiment, the product (CA R mod N) of the certification CA and the random number (R) are transmitted from the user support computer 22 to the computer 24. The product (CA R) is converted into the identification information Ia using the scrambling factor (Y) defined as $Y=R^e \cdot \bmod N$ in the computer 24. That is, neither a third person nor the computer 24 can obtain the certification CA. Thus, even if the computer 24 is used by an unauthorized user, the certification CA cannot be stolen by the unauthorized user. As a result, a higher security level can be obtained.

In addition, in the above embodiment, the computer 24 for authenticating the user transmits random numbers (b) each having a value of "0" or "1" to the user support computer 22. The user support computer 22 returns the scrambled certification (X=CA R·mod N) to the computer 24 only when a random number (b) having a value of "1" is received. When the random number (b) has the value of "0" the user support computer 22 transmits predetermined data (e.g. the random number R). In this case, since the certification CA is transmitted in accordance with the value of the random number (b), neither a third person nor the regular user can know when the certification CA is transmitted from the user support computer 22 to the computer 24. Thus, higher level security can be obtained. Furthermore, even if a third person can tap the certification CA and the scrambler (Y) when the random number (b) has the value of "1", since the random number (b) is changed, the third person cannot continue to impersonate the regular user using the tapped certification. That is, if the random number (b) has the value of "1" when of the certification is tapped and the random number has the value of "0" in the unauthorized use of the certification, the unauthorized user must obtain the random number R from the scrambling factor (Y). The work required to obtain the random number R is equivalent to the deciphering work of the RAS cipher. Thus, it is virtually impossible for the unauthorized user to obtain the random number R.

Furthermore, the computer 24 repeats the process n times, in which process it is determined whether the identification information Ia deciphered from the received certification CA is valid (random number b="1") and the predetermined data (X=R) is valid (random number b="0"). Thus, the probability of reproducing a pattern of the random numbers (b) obtained in the process repeated n times is equal to $(½)^n$. If n is set more than 10 (n>10), the probability is almost zero. That is, it is impossible for the unauthorized user to impersonate the regular user using the tapped certification.

To facilitate high speed processing, it is preferable that the public key (e) be as small as possible within a range in which the security can be permitted by the user (the minimum value of the public key (e) being equal to "3").

The authenticating system in the above embodiment may be modified so as to have three operation modes, each of which can be selected by the user.

The first operation mode is suitable for a case in which the user desires that the authentication of the user be rapidly obtained. The security level is low. In the first operation mode, the certification CA (see the equation (1)) issued by the certification authority 21 is transmitted from the user support computer 22 to the computer 24 via the network 23, without modification. The computer 24 deciphers the certification authority 21 using the public key (e) in accordance with the following equation, so that the identification information (Ia) is obtained.

$$Z=CA^e=Ia^{de}=Ia$$

The second operation mode is suitable for a case in which the user desires that the security level be high. In the second operation mode, the same operation is performed as in a case where the random number (b) has a value of "1" in the above embodiment. That is, the scrambled certification X (CA R mod N) and the scramble factor ($Y=R^e \cdot \bmod N$) are transmitted from the user support computer 22 to the computer 24. The computer 24 descrambles and deciphers the scrambled certification X using the public key (e) and public information (N) (see the equations (4), (5) and Z/Y).

The third operation mode is suitable for a case in which the user desires that the security level is higher than that in the second operation mode. In the third operation mode, the same operation is performed as in the above embodiment. That is, the computer 24 transmits the random numbers (b) each having a value of either "0" or "1". The user support computer 22 returns X=R or X=CA·R·mod N to the computer 24 in accordance with the value of the random numbers (b).

According to the above modification, the user can select an operation mode in accordance with the security level and the processing speed which are desired by the user.

The authenticating system is applicable to a bulletin board system as shown in FIG. 7.

Referring to FIG. 7, a bulletin board system has three systems 100, 200 and 300. The system 100 is connected to the system 200 by a line 400. The systems 100 and 200 are connected to the system 300 by a network 500. The system 100 has a server 101 (a computer) for managing the system 100, a storage unit 110 for storing information used in the system 100, and user support computers 102, 103 and 104 connected to the server 101 by the line 400. The system 200 has the same structure as the system 100. That is, the system 200 has a server 201, a storage unit 210, and user support computers 202, 203 and 204. The system 300 also has the same structure as the systems 100 and 200.

In the above bulletin board system, each server corresponds to the computer 24, shown in FIG. 3, for authenticating users. Each of the user support computers 101, 102, 103, 201, 202, 203, . . . corresponds to the user support computer 22, shown in FIG. 3, operated by the user. When the user having the certification C issued by a certification authority (not shown in FIG. 7) inputs the certification C in one of the user support computers, the operations are performed, in accordance with the procedures shown in FIGS. 4 and 5, in a user support computer to which the certification is input and in each of the servers in the systems 100, 200 and 300, in the same manner as those in the above embodiment. If each of the servers in the systems 100, 200 and 300 authenticates the user, the user operates the user support computer and can access and use, via the line 400 and the network 500, information in the storage units connected to the servers in the systems 100, 200 and 300.

According to the above bulletin board system, the information in this system can be confidentially shared only by users having certifications.

The present invention is not limited to the aforementioned embodiments and the modification, and variations and other modifications may be made without departing from the scope of the claimed invention.

What is claimed is:

1. A user authenticating system of a computer system storing original information corresponding to a user of the computer system, said user authenticating system comprising:

certification authority means for issuing a certification to the user, the certification being determined by enciphering the original information including at least information identifying the user using a secret key;

authenticating means for authenticating the user based on the certification, said authenticating means comprising:
      deciphering means for obtaining the original information by deciphering the certification using a public key, and
      determination means for authenticating the user by determining whether the user is an authorized user based on the original information obtained by the deciphering means; and supply means, communicating with said authenticating means, for transmitting the certification issued by said certification authority to said authenticating means based on operations of the user.

2. The system as claimed in claim 1, wherein said supply means comprises scrambling means for scrambling the certification, for producing a scrambled certification, and for outputting the scrambled certification to said authenticating means, and wherein said deciphering means comprises descrambling means for descrambling the scrambled certification.

3. The system as claimed in claim 1, wherein said authenticating means further comprises means for randomly supplying timing information to said supply means, and wherein said supply means receives the timing information and supplies the certification to said authenticating means each time the timing information is received.

4. The system as claimed in claim 3, wherein said deciphering means and said determining mean are activated each time the certification is supplied from said supply means to said authenticating means, said authenticating means for authenticating the user after said determining means determines a predetermined number of times that the user is authorized to use the computer system.

5. The system as claimed in claim 1, wheein said certification authority means comprises enciphering means for obtaining the certification by enciphering the original information using the secret key and public information in accordance with the following equation, $C = Ia^d \cdot \mod N$, wherein C is a value of the certification and Ia is a value of the original information.

6. The system as claimed in claim 5, wherein the supplying means comprises:

random number generating means for generating a random number R;

first scrambling means for obtaining data X by scrambling the certification using the random number R supplied from said random number generating means and the public information N in accordance with the following equation, $X = C \cdot R \cdot \mod N$; and second scrambling means for generating a scrambling factor Y in accordance with the following equation, $Y + R^e \cdot \mod N$, wherein the data X and the scrambling factor Y are supplied to said authenticating means, and wherein said deciphering means comprises means for obtaining the original information in accordance with the following formula, $X^e / Y \cdot \mod N = (C^e \cdot R^e) / R^e = Ia^{de} = Ia$, wherein e is a value of the public key.

7. The system as claimed in claim 5, wherein said authenticating means further comprises timing decision means for supplying first timing information and second timing information to said supply means at random, wherein said supply means comprises:

first random number generating means for generating a random number R;

first scrambling means for obtaining data X by scrambling the certification using the random number supplied from said first random number generating means and the public information in accordance with the following equation, $X = C \cdot R \cdot \mod N$;

second scrambling means for generating a scrambling factor Y in accordance with the following equation, $Y = R^e \cdot \mod N$, the scrambling factor Y being transmitted to said authenticating means;

first control means for supplying the data X to said authenticating means each time the first timing information is received; and second control means for supplying the random number R as the data X to said authenticating means each time the second timing information is received, and wherein said deciphering means further comprises:

first means for obtaining the original information Ia each time the first timing information is received by said supply means in accordance with the following formula, $X^e / Y \cdot \mod N = (C^e \cdot R^e) / R^e = Ia^{de} = Ia$; and second means for performing a calculation in accordance with the following formula each time the second timing information is supplied to said supplying means, $X^e \cdot \mod N$, said determining means determining based on a result obtained by one of said first means and said second means whether the user is authorized to use the computer system, wherein e is a value of the public key.

8. The system as claimed in claim 7, wherein said timing decision means comprises a second random number generating means for generating random numbers, each random number having one of a first value corresponding to the first timing information and a second value corresponding to the second timing information.

9. The system as claimed in claim 8, wherein the first value and the second value are respectively "1" and "0".

10. The system as claimed in claim 7, wherein said determination means repeatedly determines a predetermined number of times bases on the result obtained by one of said first means and said second means whether the user is authorized to use the computer system, said authenticating means authenticating the user based on a determination result obtained by said determining means.

11. The system as claimed in claim 1, wherein the computer system includes a level of security selected by the user and the public key is a minimum value within a range permitting the level of security.

12. The system as claimed in claim 1, wherein said computer system is a bulletin board system having a plurality of computers sharing information stored in a device, the device being in communication with said plurality of computers.

13. A user authenticating system of a computer system storing original information corresponding to a user of the computer system said user authenticating system comprising:

certification authority means for issuing a certification to the user, the certification being determined by enciphering the original information including at least information identifying the user using a secret key; and a communicating system comprising:

a first unit authenticating the user based on the certification, and a second unit transmitting the certification issued by said certification authority to said first unit, said communicating system operating in a mode selected from among one of three modes comprising:

a first mode in which said second unit transmits the certification without modification, and said first unit obtains the original information by deciphering the certification and authenticates the user based on the original information;

a second mode in which said second unit scrambles the certification and transmits data obtained by scrambling the certification to said first unit, and said first unit obtains the original information by descrambling and deciphering the data transmitted from the second unit and authenticates the user based on the original information; and a third mode in which said first unit transmits timing information to the second unit at random, said second unit scrambles the certification and transmits data obtained by scrambling the certification to said first unit each time the timing information is received, and said first unit obtains the original information each time the timing information is transmitted by descrambling and deciphering the data transmitted from the second unit and authenticates the user based on the original information.

14. A user authenticating method of a computer system storing original information corresponding to a user of the computer system, said method comprising the steps of:

(a) issuing a certification from certification authority means to the user, the certification being determined by enciphering original information including at least information identifying the user using a secret key;

(b) supplying the certification from the user to an authenticating unit; and (c) authenticating the user in said authenticating unit based on the certification, said step (c) including steps of:

(c-1) obtaining the original information by deciphering the certification using a public key and producing a result based on the original information;

(c-2) determining based on the original information obtained by said step (c-1) whether the user is authorized to use the computer system, the result obtained by said step (c-2) being used to authenticate the user.

15. The method as claimed in claim 14, wherein said step (b) comprises a step of supplying data corresponding to a scrambled certification key to said authenticating unit by scrambling the certification, and wherein said step (c-1) comprises a step of descrambling the data corresponding to the scrambled certification.

16. The method as claimed in claim 14, further comprising a step of:

(d) outputting timing information from said authenticating unit, and wherein said step (b) supplies the certification to said authenticating unit each time the timing information is received.

17. The method as claimed in claim 16, wherein said step (c-1) and said step (c-2) are activated each time the certification is supplied to said authenticating unit, the user being an authenticated user when said step (c-2) repeatedly determines a predetermined number of times that the user is authorized to use the computer system.

18. The method as claimed in claim 14, wherein said step (a) comprises a step of obtaining the certification by enciphering the original information using the secret key and public information in accordance with the following equation, $C = Ia^d \cdot \mod N$, wherein Ia is a value of the original information, d is a value of the secret key, and C is a value of the certification.

19. The method as claimed in claim 18, wherein said step (b) comprises the steps of:

(b-1) generating a random number R;

(b-2) obtaining data X by scrambling the certification using the random number R obtained by said step (b-1) and the public information N in accordance with the following equation, $X = C \cdot R \cdot \mod N$; and (b-2) generating a scrambling factor Y in accordance with the following equation, $Y = R^e \cdot \mod N$, the data X and the scrambling factor Y being transmitted to said authenticating unit, and wherein said step (c-1) carried out in said authenticating unit comprises a step of:

(c-1-1) obtaining the original information by performing a calculation in accordance with the following formula, $X^e / Y \cdot \mod N = (C^e \cdot R^e) / R^e = Ia^{de} = Ia$, wherein e is a value of a public key.

20. The method as claimed in claim 18, further comprising a step of:
(e) outputting first timing information and second timing information from said authenticating unit at random, and wherein said step (b) comprises the steps of:
(b-1) generating a random number R;
(b-2) obtaining data X by scrambling the certification using the random number R obtained by said step (b-1) and the public information N in accordance with the following equation, $$X = C \cdot R \bmod N;$$

(b-3) generating a scrambling factor Y in accordance with the following equation, $$Y = R^e \bmod N,$$

the scrambling factor Y being transmitted to said authenticating unit;
(b-4) supplying the data X to said authenticating unit each time the first timing information output by said authenticating unit in said step (e) is received; and
(b-5) supplying the random number R as the data X to said authenticating unit each time the second timing information output by said authenticating unit is received in step (e), and wherein said step (c-1) further comprises the steps of:
(c-1-1) obtaining the original information each time the first timing information is output n step (e) in accordance with the following formula, $$X^e/Y \bmod N = (C^e \cdot R^e)/R^e = Ia^{de} = Ia; \text{ and}$$

(c-1-2) performing a calculation in accordance with the following formula each time the second timing information is output in step (e), $$X^e \bmod N,$$

said step (c-2) determining based on a result obtained by one of said step (c-1-1) and said step (c-1-2) whether the user is authorized to use the computer system, wherein e is a value of a public key.

21. The method as claimed in claim 20, wherein said step (c-2) repeatedly determines a predetermined number of times based on the result obtained by one of said step (c-1-1) and said step (c-1-2) whether the user is authorized to use the computer system, said authenticating unit determining that the the user is an authorized user based on a determination result obtained by said step (c-2).

* * * * *

UNITED STATES PATENT AND TRADEMARK OFFICE
CERTIFICATE OF CORRECTION

PATENT NO. : 5,475,758
DATED : DECEMBER 12, 1995
INVENTOR(S) : Hiroaki KIKUCHI

It is certified that error appears in the above-indentified patent and that said Letters Patent is hereby corrected as shown below:

TITLE PAGE [57] ABSTRACT, line 5, "is," should be --is--;
    line 6, "system," should be --system--.

Col. 12,    line 55, "(b-2)" should be --(b-3)--.

Signed and Sealed this

Ninth Day of July, 1996

Attest:

Attesting Officer

BRUCE LEHMAN

Commissioner of Patents and Trademarks